United States Patent
Rey

(10) Patent No.: US 10,589,773 B2
(45) Date of Patent: Mar. 17, 2020

(54) DASHBOARD GASKET FOR COUPLING A POWER STEERING DEVICE TO THE DASHBOARD OF A VEHICLE

(71) Applicant: JTEKT EUROPE, Irigny (FR)

(72) Inventor: Laurent Rey, Villeurbanne (FR)

(73) Assignee: JTEKT EUROPE, Irigny (FR)

( * ) Notice: Subject to any disclaimer, the term of this patent is extended or adjusted under 35 U.S.C. 154(b) by 52 days.

(21) Appl. No.: 15/742,863

(22) PCT Filed: Jul. 29, 2016

(86) PCT No.: PCT/FR2016/051984
§ 371 (c)(1),
(2) Date: Jan. 8, 2018

(87) PCT Pub. No.: WO2017/021638
PCT Pub. Date: Feb. 9, 2017

(65) Prior Publication Data
US 2018/0201297 A1 Jul. 19, 2018

(30) Foreign Application Priority Data
Jul. 31, 2015 (FR) ...................................... 15 57391

(51) Int. Cl.
*B62D 1/20* (2006.01)
*B62D 1/16* (2006.01)
*B60R 13/08* (2006.01)

(52) U.S. Cl.
CPC ............ *B62D 1/20* (2013.01); *B60R 13/0846* (2013.01); *B62D 1/16* (2013.01)

(58) Field of Classification Search
CPC .......... B62D 1/16; B62D 1/20; B62D 5/0403; B62D 3/12; B60R 13/0846; B60R 13/0853
See application file for complete search history.

(56) References Cited

U.S. PATENT DOCUMENTS 4,421,326 A * 12/1983 Drygalski ............ F16J 15/3252
277/552
7,484,760 B2 * 2/2009 Suzuki ................ B60R 13/0846
277/392

(Continued)

FOREIGN PATENT DOCUMENTS

DE         94 05 633 U1    6/1994
DE    10 2006 008 849 A1    8/2007

(Continued)

OTHER PUBLICATIONS

Nov. 21, 2016 International Search Report issued in International Patent Application No. PCT/FR2016/051984.

*Primary Examiner* — Laura Freedman
(74) *Attorney, Agent, or Firm* — Oliff PLC

(57) ABSTRACT

A vehicle fitted with a steering device including a steering mechanism protected by a steering casing, the steering casing itself being housed in an engine compartment that is separated from the interior of the vehicle by a dashboard, the steering device also including a steering wheel, located in the interior, and to which the steering mechanism is connected by a steering column that extends out of the steering casing and passes through the dashboard, the vehicle including, in order to provide a seal around the steering column, between the steering casing and the dashboard, an elastomeric coupling gasket including, in a single piece, a central first sealing ring that surrounds and clamps around the steering column and a peripheral second sealing ring that is inserted between the steering casing and the dashboard, at a distance from and around the first sealing ring.

19 Claims, 3 Drawing Sheets

(56) References Cited

U.S. PATENT DOCUMENTS

| | | | | |
|---|---|---|---|---|
| 7,665,378 B2 * | 2/2010 | Nakamura | ............ | B62D 5/0403 |
| | | | | 74/388 PS |
| 7,878,544 B2 * | 2/2011 | Arce | ................ | B62D 1/16 |
| | | | | 280/779 |
| 7,976,027 B2 * | 7/2011 | Noro | .................. | B60R 13/0846 |
| | | | | 277/634 |
| 8,469,399 B2 * | 6/2013 | Allen | ................... | F16J 15/3224 |
| | | | | 277/630 |
| 9,108,671 B2 * | 8/2015 | Allen | ....................... | B62D 1/16 |
| 9,200,676 B2 * | 12/2015 | Yamaguchi | ............... | B62D 3/02 |
| 9,216,759 B2 * | 12/2015 | Kim | .......................... | F16D 3/84 |
| 9,669,882 B2 * | 6/2017 | Allen | ...................... | B62D 25/02 |
| 9,752,684 B2 * | 9/2017 | Allen | ...................... | B62D 1/16 |
| 2009/0001673 A1 | 1/2009 | Braun et al. | | |
| 2018/0073565 A1 * | 3/2018 | Izumi | ....................... | B62D 1/16 |
| 2018/0208234 A1 * | 7/2018 | Rey | ...................... | B62D 5/0403 |
| 2018/0229760 A1 * | 8/2018 | Rey | ...................... | B62D 5/0403 |

FOREIGN PATENT DOCUMENTS

| | | | |
|---|---|---|---|
| EP | 0 213 977 A1 | | 3/1987 |
| EP | 0300854 A1 | * | 1/1989 |
| JP | 11005545 A | * | 1/1999 |
| JP | 11132328 A | * | 5/1999 |
| JP | 2006111189 A | * | 4/2006 |
| JP | 2011068164 A | * | 4/2011 |
| JP | 2014141183 A | * | 8/2014 |

* cited by examiner

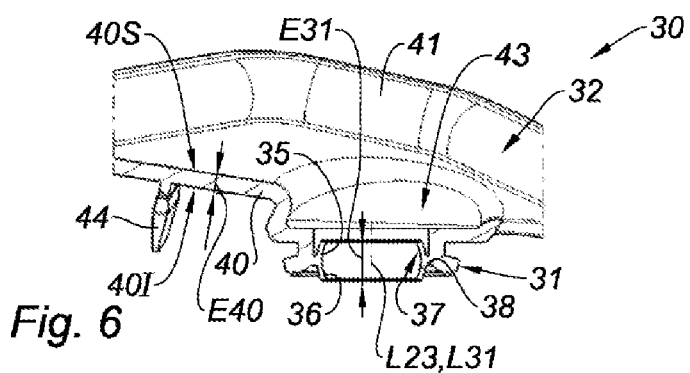
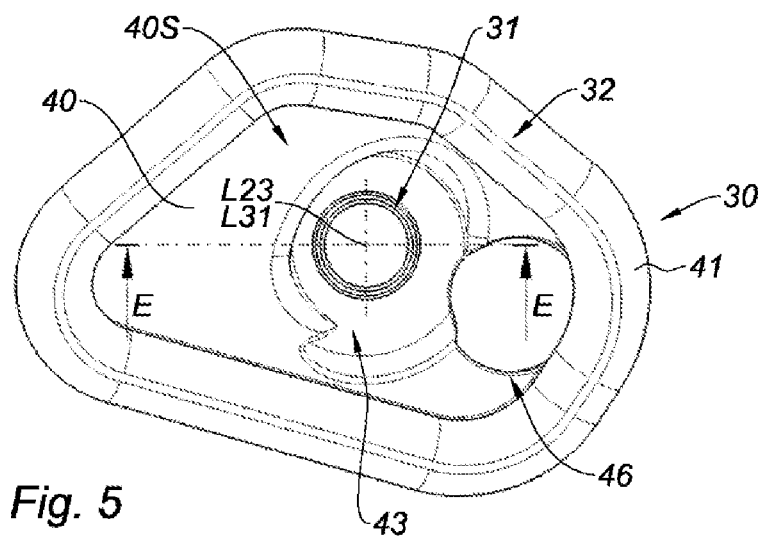
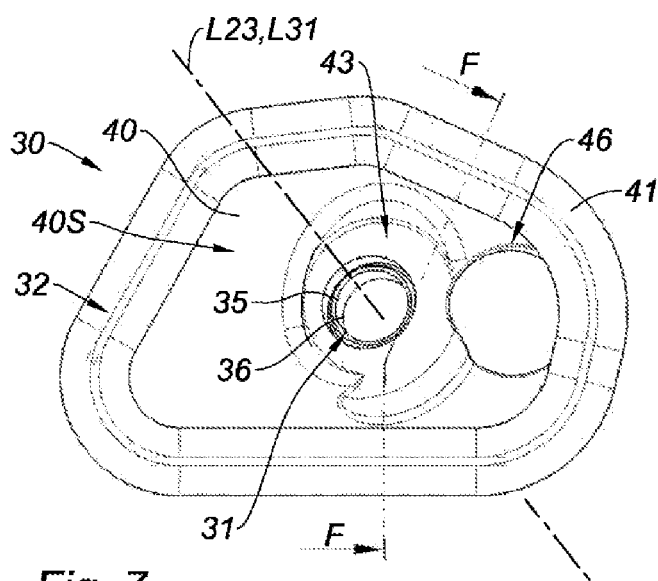
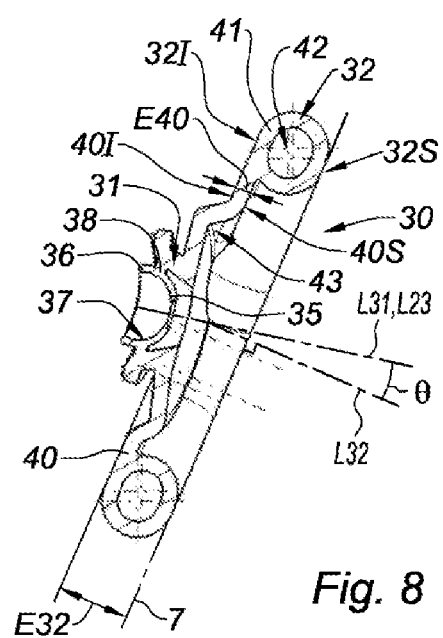
Fig. 6
Fig. 5
Fig. 7
Fig. 8

DASHBOARD GASKET FOR COUPLING A POWER STEERING DEVICE TO THE DASHBOARD OF A VEHICLE The present invention concerns the general field of the steering devices for vehicles, and in particular the power steering devices, and deals more particularly with the assembling of steering modules on vehicles.

In a manner known per se, a steering device generally comprises a steering rack, which is mounted in translation in a steering casing fastened to the chassis of the vehicle, and whose left and right ends are each connected, via a steering tie rod, with a stub axle carrying a steered wheel, so that the displacement in translation of the rack causes the modification of the yaw angle (steering angle) of said steered wheels.

Such a steering device also comprises a steering column, which one end is provided with a pinion which meshes with the steering rack, and whose other end is provided with a steering wheel, which allows a driver installed in the passenger compartment of the vehicle to maneuver the steering device.

The steering device being generally housed in the engine compartment located at the front of the vehicle, it is necessary that the steering column passes through the partition wall, called "bulkhead", which separates said engine compartment from the passenger compartment.

In order to avoid the loss of the lubricant present in the steering casing, but also to preserve the steering device, as well as the passenger compartment, from corrosion and fouling, by preventing the intrusion of water and dust into said steering casing, respectively into said passenger compartment, it is necessary to make a sealed junction between the steering casing and the bulkhead.

To this end, it is known to machine the steering casing in order to create a bore-type basis, in which a first lip seal is housed, whose lip(s) conform(s) to the steering column.

It is also known to complete the sealing of the junction by interposing and by compressing, between the steering casing and the bulkhead, a second flat static seal.

If such an arrangement generally gives satisfaction as to the obtained sealing, it may however have some drawbacks.

Firstly, the achievement of the sealed junction requires carrying out a relatively precise machining of the steering casing to accommodate the lip seal, which complicates the manufacture and increases the cost of the device.

Then, the set-up of the different seals sometimes makes difficult the mounting of the steering device on the vehicle, since the mounting operation includes in particular a risk of displacing inadvertently or clamping either of the seals, and thus damaging the concerned seal, reducing its service life, or immediately causing a leak.

Furthermore, depending on manufacturing and assembling tolerances, the attitude (that is to say the pitch and roll inclination) of the steering casing relative to the bulkhead may vary from one vehicle to another, so that the static seal may be compressed unevenly, which may, here again, locally damage said static seal to the detriment of its service life, or create sealing weaknesses in some areas.

The objects assigned to the invention therefore aim at proposing a new form of coupling between the steering casing and the vehicle bulkhead which facilitate the assembling, at lower cost, of a steering device within a vehicle while guaranteeing, in a reproducible and durable manner, an excellent sealing.

The objects assigned to the invention are achieved by means of a vehicle comprising a passenger compartment intended to accommodate at least one driver, said vehicle being equipped with a steering device which comprises a steering mechanism protected by a steering casing, said steering casing being itself housed in a compartment of the vehicle, such as an engine compartment, which is separated from the passenger compartment by at least one partition wall called "bulkhead", the steering device also comprising a steering wheel, located in the passenger compartment, a steering wheel to which the steering mechanism is connected by means of a steering column which emerges from the steering casing and which passes through the bulkhead, said vehicle being characterized in that it includes, in order to ensure the sealing around the steering column, between the steering casing and the bulkhead, a coupling seal made of an elastomeric material which comprises integrally, on the one hand, a first central sealing ring, which surrounds and clasps said steering column and through which the steering column passes across the coupling seal and, on the other hand, a second peripheral sealing ring which is interposed between the steering casing and the bulkhead, at a distance and around the first sealing ring.

Advantageously, the implementation of a coupling seal according to the invention, that is to say of a monolithic coupling seal which joins in one and a same piece both a first sealing ring and a second sealing ring, allows gathering, within one and the same coupling seal, several sealing functions, namely a first sealing function between the steering casing and the steering column, which first sealing function is carried out by means of the first sealing ring, and a second sealing function, complementary to the first one, between the steering casing and the bulkhead, which second sealing function is carried out by means of the second sealing ring.

It thus becomes in particular possible to couple the steering device to the bulkhead in a particularly simple and fast manner, by using one and the same coupling seal in order to form an interface both flexible and sealed between, on the one hand, the steering casing contained in the engine compartment and, on the other hand, the bulkhead which gives access to the passenger compartment.

Furthermore, the first sealing ring and the second sealing ring may advantageously have their own adaptive capacity by elastic deformation, in particular by radial elastic deformation (transversely or even substantially perpendicularly to the longitudinal axis of the steering column) for the first ring and by axial elastic deformation (substantially parallel to the longitudinal axis of the steering column) for the second ring, which allows said sealing rings to accommodate, respectively, and relatively independently from each other, the shape and the displacements of the steering column for the first sealing ring, and the position and the inclination of the bulkhead relative to the steering casing for the second sealing ring.

Finally, the use of a unique and stable coupling seal considerably limits the overall risk of falling of said coupling seal, or the risk of a mispositioning or an accidental sliding of a sealing ring relative to the other, when manipulating the steering casing during assembly operations.

Thus, the risks of damage to the coupling seal or of occurrence of a leak is significantly reduced upon the set-up of the steering casing against the bulkhead.

Thanks to the invention, the mounting operations of the steering device within the vehicle are therefore greatly facilitated and trusted.

Other objects, features and advantages of the invention will appear in more detail upon reading the following description, as well as with the appended drawings, provided for purely illustrative and non-limiting purposes, among which:

FIG. 5 illustrates, according to a top view in a plane perpendicular to the longitudinal axis (axis of rotation) of the steering column, the coupling seal of FIG. 3.

FIG. 6 illustrates, according to a partial view in lateral section E-E, the coupling seal of FIG. 5.

FIG. 7 illustrates, according to a top view in the plane of the bulkhead, the coupling seal of FIGS. 5 and 6.

FIG. 8 illustrates, according to a lateral sectional view F-F, the coupling seal of FIG. 7.

The present invention concerns a vehicle 1, preferably a motor vehicle 1, intended for example for the passengers' transportation.

Figure 1:
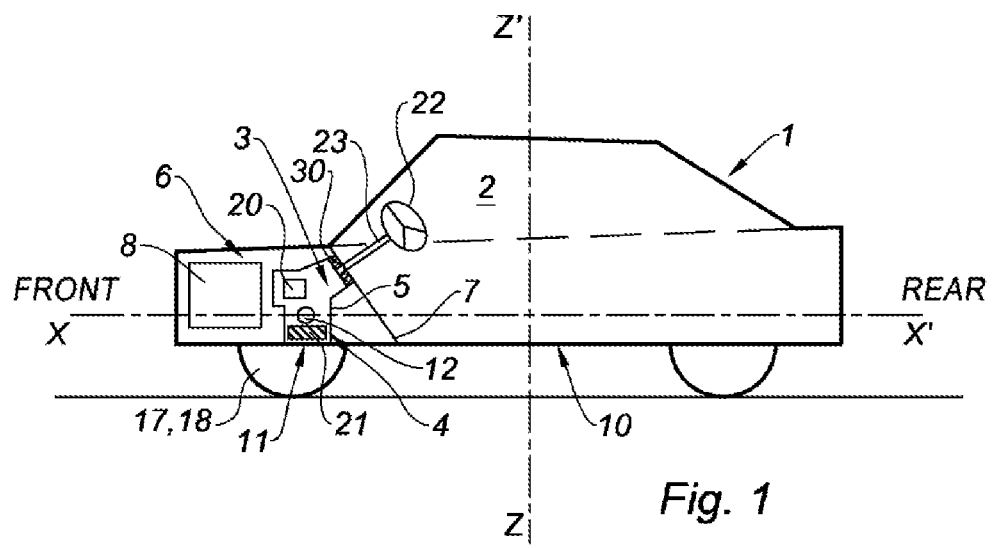
FIG. 1 illustrates, according to a schematic side view, the implantation, according to the invention, of a steering device within a vehicle.
Figure 3:
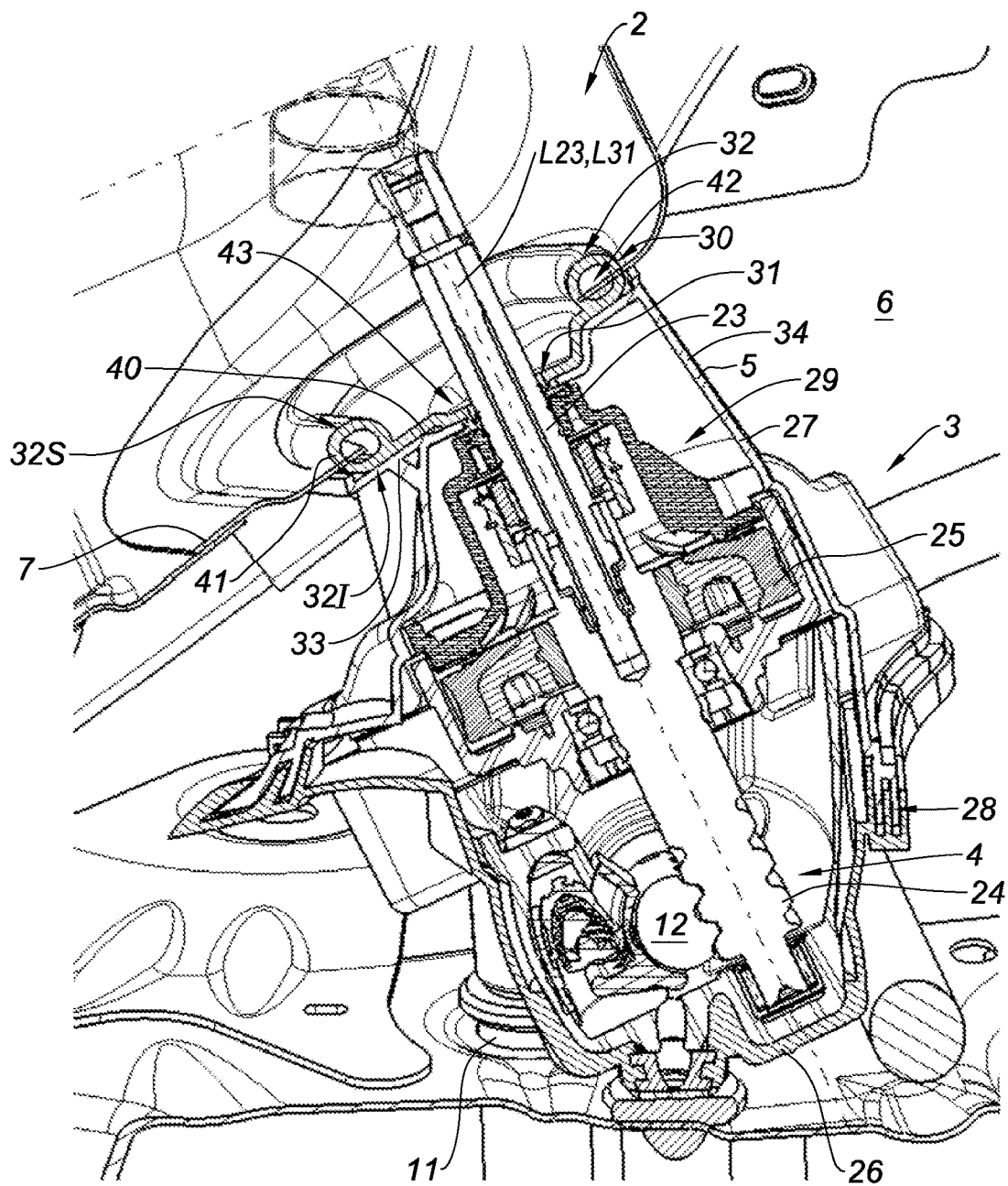
FIG. 3 illustrates, according to a detail view in longitudinal section along the axis of rotation of the steering column, the steering device of FIG. 2 coupled against the bulkhead of the vehicle.

As illustrated in FIGS. 1 and 3, said vehicle 1 comprises a passenger compartment 2 intended to accommodate at least one driver and, when appropriate, one or more passenger(s).

The vehicle 1 is equipped with a steering device 3 which comprises a steering mechanism 4 protected by a steering casing 5.

Said steering casing 5 is itself housed in a compartment 6 of the vehicle, such as an engine compartment 6, which is separated from the passenger compartment 2 by at least one partition wall 7 called "bulkhead".

Preferably, as illustrated in FIG. 1, the compartment 6 which accommodates the steering casing 5 is an engine compartment, in which the propulsion motor 8 intended to propel the vehicle 1 is located.

The steering casing 5 may then advantageously take place under the propulsion motor 8, and be fastened to the chassis 10 of the vehicle 1, for example at a cradle 11 belonging to the understructure of said chassis 10.

However, the invention remains perfectly applicable to other types of configuration, and in particular to a vehicle 1 within which the compartment 6 would be intended for another use, and would form for example a luggage compartment.

Figure 2:
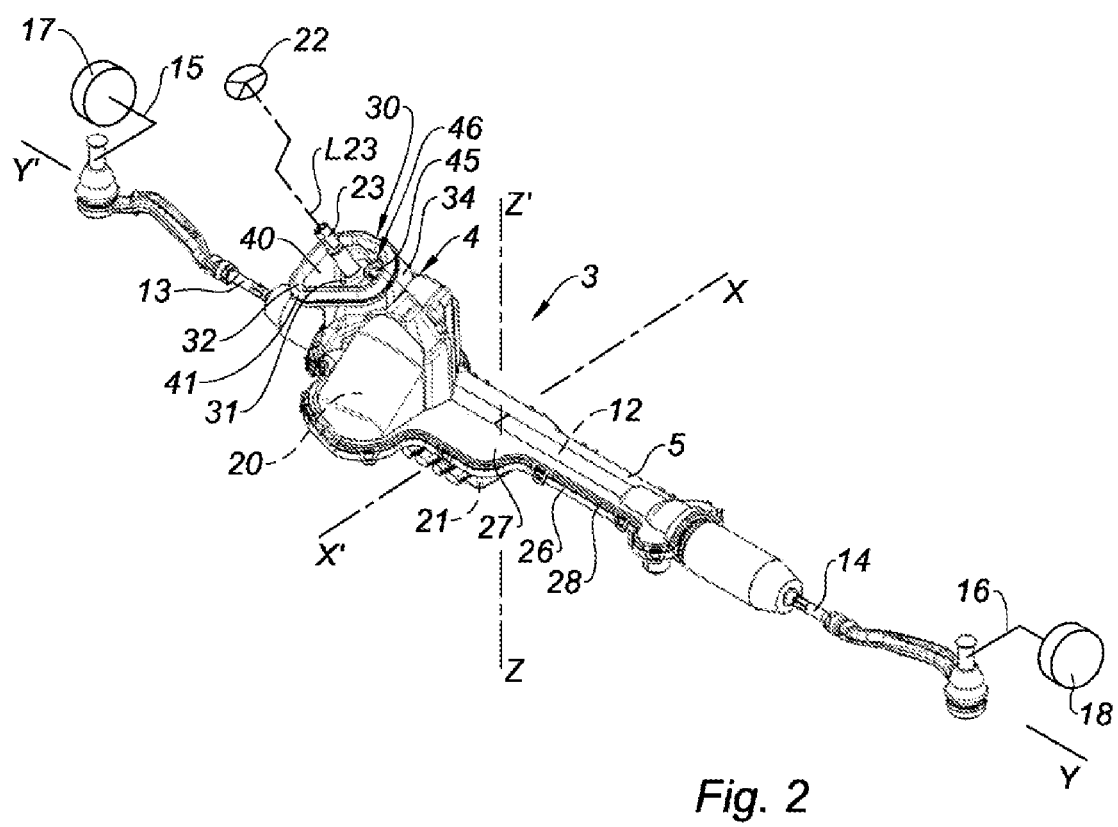
FIG. 2 illustrates, according to a perspective overview, a power steering device whose steering casing is provided with a coupling seal according to the invention.

In a manner known per se, the steering mechanism 4 preferably comprises, as seen in FIG. 2, a steering rack 12, which is mounted (and guided) in translation in the steering casing 5, and whose left and right ends are each connected, via a steering tie rod 13, 14, with a stub axle 15, 16 carrying a steered wheel (and preferably drive wheel) 17, 18, so that the displacement in translation of the rack 12 causes the modification of the yaw angle (steering angle) of said steered wheels 17, 18.

Preferably, the translation of the rack 12 takes place along the longitudinal axis of the rack (YY'), which is preferably substantially coincident with the right-left transverse axis of the vehicle 1.

Moreover, the front-rear longitudinal axis will be noted (XX'), and the bottom-top vertical axis will be noted (ZZ'), axes which form with the transverse axis (YY') a direct trihedron.

Preferably, the steering device 3 is a power steering device which also includes an assist motor 20, preferably an electrical assist motor, for example of the «brushless» type, piloted by a calculator 21 and arranged to assist the maneuver of the steering mechanism 4 according to predetermined assistance laws, stored in a nonvolatile memory of said calculator 21.

As illustrated in FIGS. 1 and 2, the steering device 3 also comprises a steering wheel 22, located in the passenger compartment 2, steering wheel 22 to which the steering mechanism 4 is connected by means of a steering column 23 which emerges from the steering casing 5 and which passes through the bulkhead 7, as detailed in FIG. 3.

The steering column 23 is also provided, at its end opposite to the end carrying the steering wheel 22, with a drive pinion 24 which meshes with the rack 12.

The assist motor 20 may indifferently act indirectly on the rack 12, via a reducer 25, such as a worm wheel and a worm screw reducer, which engages the steering column 23, as illustrated in FIG. 3 or even directly, for example, by means of a second pinion distinct and distant from the drive pinion 24 (the steering mechanism thus forming a mechanism called «double pinion» mechanism) or by means of a ball screw.

Preferably, the steering casing 5 will be formed by a shell obtained by joining a bottom shell portion 26, forming a base 26, and an upper shell portion 27, forming a bell-housing 27, which covers said base 26.

Preferably, the bell-housing 27, and more preferably both the bell-housing 27 and the base 26, are made of a rigid or semi-rigid thermoplastic polymer, that is to say, having typically a Young's modulus higher than 3 GPa, at least over the predictable range of the operating temperatures of the steering device 3, that is to say at least in the range from −40° C. to +125° C.

For indicative and non-limiting purposes, it is possible in particular to use as polymer materials, in order to form the bell-housing 27 and/or the base 26: a Polyamide (PA), an aromatic Polyamide (PPA), a Polybuthylene Terephthalate (PBT), a Polyethylene Terephthalate (PET), a Polypropylene (PP), or a Polyketone (PK), the polymer material being possibly fiber-reinforced.

The manufacture of the shell portions 26, 27, and more generally of the steering casing 5, may thus be simply and inexpensively carried out by molding. Furthermore, the steering casing 5 obtained accordingly is particularly light.

The bell-housing 27 is fastened on the base 26, for example by bending or thermo-welding, according to a sealed junction 28 so as to cover, at least partially, the steering mechanism 4 with a sealed envelope, which delimits a protective enclosure 29.

Preferably, the assist motor 20 and the calculator 21 are also sheltered in the enclosure 29.

Advantageously, the shell 26, 27, and more generally the steering casing 5, prevent the lubricant of the steering mechanism 4 from escaping from the enclosure 29, and form a sealed barrier which protect the steering mechanism 4, and more generally any member placed in the enclosure 29, at least against the intrusion of dust, aggregate (in particular salt or sand grains), liquid water and salt spray.

The term «salt spray» means the salt water droplets suspended in the air, which may in particular appear when the vehicle 1 circulates near a seacoast, or on a snow-covered road treated with salt.

According to the invention, and as illustrated in particular in FIG. 3, the vehicle 1 includes, in order to ensure the sealing around the steering column 23, between the steering casing 5 and the bulkhead 7, a coupling seal 30 made of elastomer material which comprises integrally, on the one hand, a first central sealing ring 31 which surrounds and clasps said steering column 23 and through which the steering column 23 passes across the coupling seal 30 and, on the other hand, a second peripheral sealing ring 32, which is interposed between the steering casing 5 and the bulkhead 7, at a distance and around the first sealing ring 31.

Thus, the first sealing ring 31, acts as a first seal, and therefore as a first sealed barrier, which conforms to the steering column 23 in order to ensure a first sealed junction between the steering casing 5 and said steering column 23.

Thanks to the first sealing ring 31, the steering column 23 may thus pass across the coupling seal 30, in the direction of the thickness of said coupling seal 30, while sealingly cooperating with the latter.

Similarly, the second sealing ring 32, acts as a second seal, and therefore as a second sealed barrier, by ensuring a second sealed junction between the steering casing 5 and the bulkhead 7.

For this purpose, said second sealing ring 32 preferably comes into contact with the bulkhead 7 by its upper face 32S and into contact with the steering casing 5 by its lower face 32I opposite to the upper face 32S, in order to be compressed between the steering casing 5 and the bulkhead 7, here according to a direction of compression which substantially corresponds to the thickness E32 of the second sealing ring 32, and more generally which corresponds substantially to the axial direction defined by the longitudinal axis L23 of the steering column 23.

In practice, the coupling seal 30, and more particularly its second peripheral sealing ring 32, will therefore form a sealed and elastically compressible coupling interface between the steering casing 5 (and more precisely the upper part of said steering casing 5) and the bulkhead 7 (and more precisely on the bottom of the bulkhead 7).

For convenience of description, the term «axial» means a direction or dimension considered in an orientation substantially parallel to, or even coincident with, a considered reference axis, here by default the longitudinal axis L23 of the steering column 23, and the term «radial» means a direction or a dimension considered transversely, and more particularly substantially perpendicularly to said considered reference axis, here by default the longitudinal axis L23.

By way of non-limiting example, it is possible to use, as an elastomer material constituting the coupling seal 30, and more particularly as an elastomer material constituting the first sealing ring 31 and the second sealing ring 32, a natural rubber (NR), an ethylene-propylene-diene monomer (EPDM), a Nitrile-Butadiene rubber (NBR), a Hydrogenated Nitrile-Butadiene rubber (HNBR), or a silicone.

Preferably, as illustrated in FIGS. 2 and 3, the coupling seal 30, and more particularly the lower face 32I of the second sealing ring 32, rests, substantially flat and very stably, on the endplate 33 of a chimney 34 which extends along and around of the steering column 23 and which belongs to the steering casing 5, and more preferably which is formed integrally with the bell-housing 27.

Said endplate 33 is advantageously secant, and preferably substantially perpendicular, to the longitudinal axis L23 of said steering column 23, which provides excellent basis for the coupling seal 30.

It will be noted that, for simple convenience of representation, the second sealing ring 32 is represented in FIG. 3 in its rest form, that is to say uncompressed form. In fact, said second sealing ring 32, sandwiched between the endplate 33 of the steering casing 5 and the bulkhead 7, of course undergoes a deformation by axial compression, that is to say a crushing (not represented), to elastically accommodate the mutual approximation of the steering casing 5 and of the bulkhead 7.

Advantageously, the sealed junctions provided by the coupling seal 30 ensure a sealing at least against lubricant leakages from the steering mechanism 4 toward the outside of the steering casing 5, and against the intrusion, into the enclosure 29, of dust, aggregate, liquid water and salt spray, typically at pressures comprised between 1 bar (normal atmospheric pressure) and at least 3 or 4 bars, or even more (to resist in particular the water jet of a high-pressure cleaner).

As is clearly seen in FIGS. 2, 4, 5 and 7, the first sealing ring 31 and the second sealing ring 32 each surround the longitudinal axis L23 of the steering column in a continuous manner, that is to say, follow a closed contour which covers 360 degrees about said longitudinal axis L23 (in a plane normal to said axis L23).

Preferably, the first sealing ring 31 may have substantially a revolution shape, and thus follow a substantially circular contour about the longitudinal axis L23.

The second sealing ring 32 may in turn preferably have a substantially polygonal shape, which follows a broken line, formed of a succession of line segments and/or curved portions, about the same longitudinal axis L23, as seen in FIGS. 2, 4, 5 and 7.

Regardless of the respective shapes of the first and second sealing rings 31, 32, the first sealing ring 31 is in the "central" position, as opposed to the "peripheral" situation of the second sealing ring 32, that is to say that the first sealing ring 31 is radially closer to the longitudinal axis L23 than is the second sealing ring 32, itself radially farther from said longitudinal axis L23, so that the first central peripheral ring 31 is contained inside the (sealing) perimeter defined by the second peripheral sealing ring 32.

In a particularly preferred manner, said first sealing ring 31 is radially recessed from said second sealing ring 32 in all azimuth directions, that is to say in all directions perpendicular to the longitudinal axis L23.

Such a central arrangement of the first sealing ring 31 in particular gives the coupling seal 30 a compact and robust shape, which advantageously allows assembling and holding easily the coupling seal 30 on the steering casing 5.

Indeed, the proposed arrangement allows threading the coupling seal 30 on the steering column 23 (by the first sealing ring 31) then sliding said coupling seal 30 along the steering column 23 until the abutment of said coupling seal 30 against the endplate 33.

The coupling seal 30 being then retained by both the steering column 23 and the endplate 33, it is possible to manipulate the casing 5/seal 30 subassembly formed accordingly without risk of letting the coupling seal 30 fall, in particular when said subassembly is afterwards brought against the bulkhead 7.

Preferably, the first central sealing ring 31 forms a wiper seal in contact with which and inside which the steering column 23 may be displaced at least in yaw rotation, about its longitudinal axis L23.

More particularly, the radially inner wall of the first sealing ring 31 thus conforms to, and rubs against, the radially outer lateral surface of the steering column 23, in a continuous contact which extends 360 degrees about the longitudinal axis L23 of said steering column 23.

Thus, the first sealing ring 31, secured to the steering casing 5, preferably ensures a dynamic sealing, by allowing relative movements, by sliding, in particular in alternate rotation and/or in axial translation along the longitudinal axis L23, of the steering column 23 relative to the coupling seal 30, and therefore more generally relative to the steering casing 5, and relative to the bulkhead 7, without loss of contact nor loss of sealing.

By comparison, the second sealing ring 32 will preferably ensure a static sealing between the steering casing 5 and the bulkhead 7, its position remaining fixed relative to said steering casing 5 and to said bulkhead 7, once the steering device 3 is fastened in the vehicle 1.

More preferably, the first central sealing ring 31 forms a lip seal, as seen in FIGS. 6 and 8, whose lip(s) 35, 36 rub(s) against the outer (lateral) surface of the steering column 23.

Such a lip seal advantageously allows obtaining, by means of a simple and robust sealing ring arrangement 31, a reliable and durable dynamic sealing, over a large number of cycles of use, by sliding contact of the (annular) lips 35, 36 against the steering column 23.

Preferably, as clearly seen in FIGS. 6 and 8, the first sealing ring has two lips 35, 36, each corresponding to a hemisphere portion of the same spherical zone 37.

The first lip 35, oriented toward the bulkhead 7, here corresponds to an upper lip, forming—by analogy with the earth globe—a portion of the northern hemisphere, comprised between the equator of the spherical zone 37 and a north parallel, while the second lip 36, oriented toward the steering casing 5 and therefore axially shifted relative to the first lip 35 along the longitudinal axis L23 of the steering column 23, here corresponds to a lower lip, forming a portion of the southern hemisphere, comprised between the equator of the spherical zone 37 and a south parallel.

Advantageously, the implementation of two lips 35, 36 generated by a spherical zone 37 gives the first sealing ring 31 an excellent capacity to elastically conform to the shape of the steering column 23, and to accompany, where appropriate, the changes in orientation of the longitudinal axis L23 of said steering column 23, in particular in pitch and roll, which guarantees the permanent holding of a sealed contact.

Furthermore, such a spherical-shaped lip seal is advantageously easy to make by molding.

Finally, such a lip seal arrangement allows storing and retaining a lubricant, and more particularly grease, in the space comprised axially between the first lip 35 and the second lip 36 (and comprised radially between said lips 35, 36 and the steering column 23), in order to improve the sealing and, especially, to facilitate the movements of the steering column 23 in the first sealing ring 31.

Preferably, the spherical zone 37 is elastically attached and suspended to the coupling seal 30 by an annular connecting bridge 38, which surrounds the equator of said spherical zone 37 and which is formed integrally with the coupling seal 30.

Here again, this "equatorial" suspension of the spherical zone 37 by a flexible connecting bridge 38 allows the lips 35, 36, and more generally the first sealing ring 31, to elastically accompany, by an adaptation of the attitude of said first sealing ring 31 (that is to say by an adaptation of the pitch and roll inclination), possible variations in orientation of the longitudinal axis L23 of the steering column 23.

The configuration of the first sealing ring 31 within the coupling seal 30 may thus be automatically adapted to the possible tilting oscillating movements of the longitudinal axis L23 of the steering column 23 linked to the normal operation of the steering device 3, or to the different assembling conditions encountered, because of the manufacturing tolerances, from one steering mechanism 4 to the other (that is to say from one vehicle 1 to the other).

In other words, thanks to the flexibility of the lips 35, 36 and of the connecting bridge 38, which provide a link with a behavior close to the one of a ball-joint link, the central axis L31 of the first sealing ring 31, called «first central axis L31», that is to say here the (north-south) central axis of the spherical zone 37, can in practice be automatically and permanently aligned with the longitudinal axis L23 of the steering column 23 (itself rigid, and preferably metallic), so as to be substantially coincident with said longitudinal axis L23.

For convenience of description, the longitudinal axis L23 of the steering column 23 might be assimilated with the central axis L31 of the first sealing ring 31.

Preferably, as in particular seen in FIGS. 2 to 8, the first central sealing ring 31 is connected to the second peripheral sealing ring 32 by a layer 40.

Preferably, said layer 40 is substantially in the form of a sheet, of a substantially constant thickness E40, of the polymer material constituting the coupling seal 30.

Advantageously, said layer 40, which extends radially (that is to say transversely, or even substantially perpendicular to the longitudinal axis L23) from the first sealing ring 31 to the second sealing ring 32, ensures a material link between said first sealing ring 31 and the second sealing ring 32, and thus guarantees the cohesion of the coupling seal 30, within which the first and the second sealing ring 31, 32 are thus securely attached to each other.

Nevertheless, the use of an intermediate layer 40 for interconnecting the first and the second sealing ring 31, 32, however allows preserving also a degree of independence of behavior of the second sealing ring 32 relative to the first sealing ring 31 (and vice-versa) such that, despite being linked within the same coupling seal 30, the first sealing ring 31 and the second ring 32 each have a freedom of proper elastic deformation, independent of the capacity of deformation and of the state of deformation of the other sealing ring 32, 31.

The layer 40 thus forms a kind of buffer zone between the first sealing ring 31 and the second sealing ring 32, which buffer zone allows in particular the first sealing ring 31 to elastically accommodate a radial deformation (here expansion) caused by the insertion in force of the steering column 23 in said first sealing ring 31, without interfering with the axial elastic deformation capacity (here in compression) of the second sealing ring 32, which allows said second sealing ring 32 to freely accommodate the axial connection of the steering casing 5 toward the bulkhead 7.

Preferably, the second peripheral sealing ring 32, follows and delimits the radially outer terminal contour of the layer 40, and more generally of the coupling seal 30, that is to say forms the outer lateral edge of said coupling seal 30.

Preferably, as clearly seen in FIG. 8, the layer 40 is of a thickness E40 less than the thickness E32 of the second peripheral sealing ring 32, (and more particularly than the thickness E32 at rest of said second peripheral ring, before axial compression of the latter between the steering casing 5 and the bulkhead 7).

In other words, the layer 40 is, at least at rest, that is to say at least before the coupling seal 30 is pressed between the steering casing 5 and the bulkhead 7, (axially) thinner than the second sealing ring 32, which thus forms a bulge (at least axial bulge) relative to said layer 40.

Similarly, the thickness E40 of the layer is preferably less than the axial thickness (at least at rest) E31 of the first sealing ring 31, and in particular less than the thickness (the axial extent) of the spherical portion 37 constituting the lips 35, 36.

Such a thin layer arrangement 40 firstly allows saving material, since a small amount of material is sufficient to make the coupling seal 30 in one piece. Such a material saving advantageously allows lightening the coupling seal 30 and reducing the manufacturing cost therefrom.

Then, the use of a thin and consequently flexible layer 40 guarantees a degree of flexibility of the link between the first sealing ring 31 and the second sealing ring 32, which promotes the independence of the deformation behavior of each of said sealing rings 31, 32 relative to the other sealing ring 32, 31.

Furthermore, by providing for a thickness E32 of the second sealing ring greater than the thickness E40 of the layer 40, it is ensured that the second sealing ring 32, and more particularly its upper face 32S, protrudes (axially) relative to the layer 40, and therefore comes into contact with the bulkhead 7 before the layer 40, or even that the layer 40 remains recessed from the bulkhead 7, even after the mounting of the steering device 3 within the vehicle 1.

In other words, the axial compression of the second sealing ring 32 between the steering casing 5 and the bulkhead 7 occurs before a possible axial compression of the layer 40 between the steering casing 5 and the bulkhead 7.

Therefore, the position and the extent of the contact zone between the coupling seal 30 and the bulkhead 7 are controlled, the contact zone which is preferably limited to the upper face 32S of the second sealing ring 32, without extending to the upper face 40S of the layer 40. The invention therefore allows better controlling the achievement of the sealing.

Similarly, by providing a second sealing ring 32 thicker than the layer 40, protruding from said layer 40, the second sealing ring 32 is allowed to be deformed, and in particular to be compressed in thickness, before the layer 40 is itself compressed against the bulkhead 7.

In other words, such an arrangement forms a reserve of deformation (a potential magnitude of free axial deformation) for the second sealing ring 32, such that the coupling seal 30 may be deformed (crushed) in a differential manner, the crushing of the second sealing ring 32 occurring before the possible crushing of the layer 40, and without being disturbed by the presence of said layer 40.

Here again, the proposed arrangement promotes the control of the position and of the extent of the contact zone between the coupling seal 30 and the bulkhead 7, as well as the control of the stiffness of said coupling seal 30 vis-à-vis the axial compression.

Furthermore, such an arrangement allows the second sealing ring 32, and more generally the coupling seal 30, to easily accommodate the variations or the attitude defects of the bulkhead 7 relative to the steering casing 5 (and more particularly relative to the endplate 33), since the elastic (crushing) depression of the second sealing ring 32 may vary according to the considered azimuth about the longitudinal axis L23, without the layer 40 interfering with said depression.

The proposed arrangement therefore guarantees the quality and the reproducibility of the sealing during the coupling of the steering casing 5 to the bulkhead 7, regardless of the manufacturing and mounting tolerances of the steering casing 5 and of the bulkhead 7.

By way of indication, the thickness E32 of the second sealing ring may be substantially comprised between 8 mm and 40 mm, while the thickness E40 of the layer 40 may be substantially comprised between 2 mm and 6 mm.

Furthermore, also by way of indication, the difference between the thickness E32 of the second sealing ring 32 and the thickness E40 of the layer 40, that is to say the axial height of the deformation reserve specific to the second sealing ring 32, will be preferably equal to or greater than 5 mm, and for example comprised between 8 mm and 30 mm.

In absolute terms, it is not excluded that the second sealing ring 32 is massive, that is to say formed integrally, throughout its thickness E32, by a full-bead of material.

Figure 4:
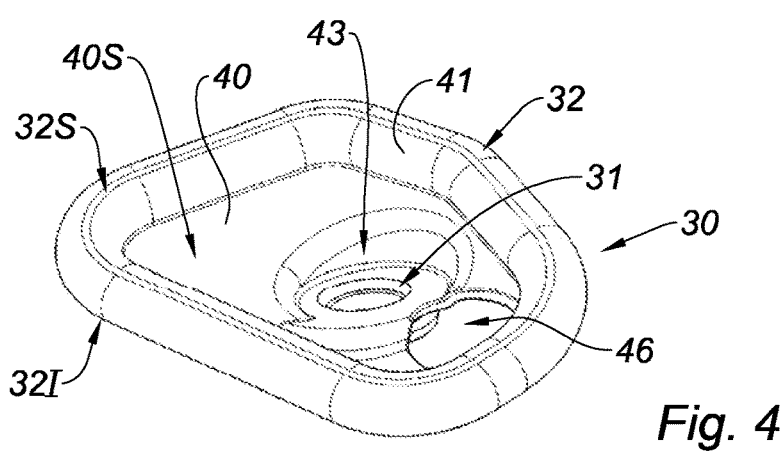
FIG. 4 illustrates, according to a perspective overview, the coupling seal used in FIGS. 2 and 3.

However, particularly preferably, and as clearly seen in FIGS. 3, 4 and 8, the second peripheral sealing ring 32 is formed by a tubular bulb 41.

The inner cavity 42 of the tubular bulb 41 might either remain hollow (that is to say devoid of material), or be filled with a foam-like flexible filling material, advantageously less rigid (that is to say having a lower Young's modulus, in particular in compression), and preferably less dense, than the polymer material constituting the envelope of the second sealing ring 32 (and more generally than the polymer material constituting the coupling seal 30).

Advantageously, such a tubular bulb 41 will form a kind of cushion combining lightness, great flexibility, due to a relatively low axial stiffness (in particular lower than that of the solid layer 40, at least at the beginning of compression), and high thickness E32, and consequently large deformation potential magnitude (in particular in axial compression) at any point of its circumference.

Here again, the coupling seal 30, by its capacity to undergo very variable deformations in position (the deformation of the tubular bulb 41 which may vary from one azimuth position to the other, about the longitudinal axis L23) and in magnitude (the same azimuth sector of the tubular bulb 41 which may accept, depending on the needs, different degrees of deformation in axial compression along the longitudinal axis L23), will be able to automatically compensate, during the assembling, the surface defects of the bulkhead 7 or of the steering casing 5, as well as the relative attitude variations between these two elements.

Preferably, as seen in FIGS. 6 and 8, the first sealing ring 31 protrudes from the layer 40 on a first face 401 of said layer (here the lower face) oriented toward the steering casing 5, while the second sealing ring 32 protrudes from the layer 40 on a second face 40S of the layer (here the upper surface) oriented toward the bulkhead 7, opposite to the first sealing ring 31.

Thus, each of the first and second sealing rings 31, 32 extends respectively mostly or even entirely on one side of the layer 40, axially opposite to the other sealing ring 32, 31.

Advantageously, such a spatial distribution, in this case such an axial separation, facilitates the two-step assembling of the coupling seal 30, since the coupling seal 30 can first be mounted on the steering casing 5, by engaging the first sealing ring 31 on the steering column 23 and by depressing the coupling seal 30 until said coupling seal 30 abuts against the endplate 33 (by the lower face 32S of the second sealing ring 32 and/or by the lower face 40S of the layer 40), and then the steering device 3 may be placed against the bulkhead 7, by bringing the steering casing 5 closer to said bulkhead 7 until the second sealing ring 32 bears against said bulkhead 7, without the action of the first sealing ring 31 on the steering column 23 interfering with, or being disturbed by, the action of the second sealing ring 32 against the bulkhead 7.

Preferably, as clearly seen in FIGS. 4 and 6, the layer 40 will even have, relative to its upper face 40S and relative to the second sealing ring 32, an axial depression 43, forming a kind of well, at the bottom of which the first sealing ring 31 is located (and opens).

Such an arrangement will further promote the axial shift between the two sealing rings 31, 32.

According to a preferred feature which may constitute an invention in its own right, the first sealing ring 31 is oriented along a first central axis L31, while the second sealing ring 32 is oriented along a second central axis L32 which has, in particular at rest, before compression of the coupling seal 30, a non-zero inclination θ relative to the first central axis L31, as illustrated in FIG. 8.

In other words, the first central axis L31, along which the first sealing ring 31 extends axially, and which coincides, after assembling, with the longitudinal axis L23 of the steering column 23, is advantageously not parallel to the second central axis L32, along which the second sealing ring 32 extends axially in thickness E32, and which is perpendicular to the plane formed by the upper face 32S of said second ring 32, that is to say perpendicular to the plane against which the bulkhead 7 is applied.

By way of indication, the inclination θ may be equal to or greater than 1 degree, 2 degrees, or even 5 degrees.

Said inclination θ will be also preferably less than or equal to 45 degrees, and preferably less than or equal to 30 degrees, or even 25 degrees.

In particular, the inclination θ may be substantially comprised between 1 degree and 25 degrees, and more particularly between 2 degrees and 22 degrees.

Advantageously, by giving the coupling seal 30, by construction, and before assembly and compression of said coupling seal 30 between the bulkhead 7 and the steering casing 5, a non-zero inclination θ, said coupling seal is preformed such that the attitude of the first sealing ring 31, which is intended to cooperate with the steering column 23, is different from the attitude of the second sealing ring 32, which is intended to cooperate with the bulkhead 7 (by its upper face 32S) and with the steering casing 5 (by its lower face 321).

Thus, the coupling seal 30 has intrinsically, as illustrated in FIG. 8, a "wedge-like" inclined preform, which geometrically corresponds to the (predictable) configuration of implantation of the steering casing 5 relative to the bulkhead 7 within the vehicle 1, and which ensures to this end a "return angle" (of inclination value θ) between the first central axis L31 of the first sealing ring 31, and thus the longitudinal axis L23 of the steering column 23, on the one hand, and the second central axis L32 of the second sealing ring 32, and therefore the normal to the plane of the bulkhead 7, on the other hand.

Such an inclined (or "wedge-like") preform, which substantially corresponds to the "natural" angle that should in principle form the steering column 23 relative to the bulkhead 7, advantageously facilitates the set-up of the coupling seal 30 against the bulkhead 7, and therefore the implantation of the steering device 3 within the vehicle 1.

More generally, such an inclined arrangement allows the coupling seal 30 to naturally accommodate the (predictable) orientations of the steering column 23 and the bulkhead 7, which allows in particular to homogenize the axial compression (along the central axis L32) of the second sealing ring 32, by distributing said axial compression in a substantially even manner over the entire circumference of said second sealing ring (in all azimuthal directions along the central axis L32).

Advantageously, the invention indeed allows aligning the upper face 32S of the second sealing ring 32 with the plane of the bulkhead 7, while aligning the central axis L31 of the first sealing ring 31 on the longitudinal axis L23 of the steering column 23, without the need to create a too uneven axial compression of the bulb 41 or to force a too high deformation (in particular in bending) of the layer 40 in order to adapt the coupling seal 30 to the desired alignment.

Within the coupling seal 30, the inner stresses due to the assembling are therefore reduced, which improves the service life of said coupling seal 30.

In practice, the inclination value θ (at rest) selected for the coupling seal 30 will be preferably substantially equal to the predictable value of the angle formed, by construction of the vehicle 1, between the longitudinal axis L23 of the steering column 23 and the normal to the plane of the bulkhead 7 or, in an equivalent manner, to the predictable value of the angle formed between the plane of the bulkhead 7 against which should bear the coupling seal 30 and the portion of the endplate 33 perpendicularly crossed by the steering column 23.

Preferably, as illustrated in FIG. 6, the first central sealing ring 31 being connected to the second peripheral sealing ring 32, by means of a layer 40 formed integrally with said first and second sealing rings 31, 32, as described above, said layer 40 has, on one of its faces called «first face» 401 (here the lower face) which is oriented toward the steering casing 5 and which bears against the steering casing 5, at least one elastic anchoring lug 44, distinct from the first sealing ring 31, and which cooperates with the steering casing 5 by snap-fitting in order to retain the coupling seal 30 against said steering casing 5.

Preferably, the anchoring lug 44 is formed integrally with the layer 40, and protrudes substantially perpendicularly to the first (lower) face 401 of the latter, substantially parallel to the longitudinal axis L23.

Said lug 44 may in particular have an elastic harpoon shape, comprising a tip followed by an enlargement forming a stop rim, which will allow the depression and the anchoring of said lug 44 by snap-fitting into a hole of conjugate form pierced in the endplate 33 of the steering casing 5.

Preferably, said anchoring lug 44 will be placed radially between the first sealing ring 31 and the second sealing ring 32, at a distance from each of these sealing rings 31, 32, in order to ensure a fastening of the layer 40 on the steering casing 5 without interfering with the elastic operation of said sealing rings 31, 32.

Advantageously, the anchoring lug 44 will allow, in the manner of a foolproof device (centering pin), to reproducibly and accurately position the coupling seal 30 on the steering casing 5, and will further ensure the holding of said coupling seal 30 on said steering casing 5, in order to prevent any falling or any detrimental displacement of said coupling seal 30 during the manipulations of said steering casing 5 necessary to the set-up of the steering device 3 on the vehicle 1, vis-à-vis the bulkhead 7.

Of course, the coupling seal 30 might comprise several anchoring lugs 44 such as the one described above, said anchoring lugs 44 being able to be advantageously distributed at different points of the lower face 401 of the layer 40, in order to improve the stability of the coupling seal 30 on the endplate 33.

Moreover, the steering casing 5 will be preferably provided with a porous and hydrophobic breathing member 45 (FIG. 2), permeable to air but impermeable to water (liquid), arranged to allow a pressure balancing between the inside of the steering casing 5, that is to say the enclosure 29, and the outside of said steering casing, that is to say typically the passenger compartment 2 and/or more generally the ambient atmosphere which surrounds the vehicle 1.

Such a breathing member 45 may for example be formed by an air-permeable and hydrophobic textile pellet, of the Gore-Tex® type.

Said breathing member 45 will preferably pass across the wall of the steering casing 5, and more particularly of the bell-housing 27, at the endplate 33.

The coupling seal 30 will then preferably comprise, between the first sealing ring 31 and the second sealing ring 32, a vent 46 which passes across said coupling seal 30 according to its thickness, vis-à-vis the breathing member 45, in order to allow gaseous exchanges between the steering casing 5 and the passenger compartment 2 of the vehicle.

The vent 46 will be preferably in the form of a cut of the layer 40, which crosses from side to side said layer 40, axially beneath the breathing member 45, so as to discover, or even to allow the passage, of said breathing member 45.

Advantageously, the coupling seal 30 will thus ensure, always by preserving a very compact shape, a third function (in addition to the first sealing function vis-à-vis the steering column 23 and the second sealing function between the steering casing 5 and the bulkhead 7), namely the sealing around the breathing member 45 which allows the breathing of the enclosure 29.

As such, it will be noted that, the vent 46 being advantageously located radially in the protected space comprised between the first sealing ring 31, on the one hand, and the second sealing ring 32, on the other hand, said vent 46 benefits from the protection, and therefore from the sealing, provided by these sealing rings 31, 32.

Furthermore, the lower face 401 of the solid portion of layer 40, which surrounds the vent 46, is advantageously applied against the steering casing 5 so as to conform to the shape of the endplate 33, which enhances said sealing around said vent 46.

Of course, the invention is in no way limited only to the aforementioned variants, those skilled in the art being in particular able to freely isolate or combine either of the features described above, or substitute them with equivalents.

In particular, the invention also relates to a coupling seal 30 as such, which have all or part of the features described above, and which is therefore adapted to perform a sealed coupling between a steering casing 5 and a vehicle 1 bulkhead 7.

Similarly, the invention of course concerns a method for assembling a steering device 3 within a vehicle 1 by means of a coupling seal 30 according to the invention.

Thus, the invention relates as such to a method for assembling a steering device 3, comprising a steering mechanism 4 protected by a steering casing 5, in a compartment 6 of a vehicle, such as an engine compartment, which is separated from the passenger compartment 2 by at least one partition wall called "bulkhead" 7, the steering mechanism 4 comprising a steering column 23 which emerges from the steering casing 5 and which should pass across the bulkhead 7 to be connected to a steering wheel 22, said method including a step comprising placing, in order to ensure the sealing around the steering column 23, between the steering casing 5 and the bulkhead 7, a coupling seal 30 made of elastomer material which comprises integrally, on the one hand, a first central sealing ring 31 which surrounds and clasps said steering column 23 and through which the steering column 23 passes across the coupling seal 30 and, on the other hand, a second peripheral sealing ring 32, which is interposed between the steering casing 5 and the bulkhead 7, at a distance and around the first sealing ring 31.

More particularly, and according to a feature which may constitute an invention in its own, said method includes, as said above, a step comprising mounting firstly on the steering casing 5, in order to ensure the sealing around the steering column 23, between the steering casing 5 and the bulkhead 7, the coupling seal 30 made of elastomer material which comprises integrally, on the one hand, a first central sealing ring 31 and, on the other hand, a second peripheral sealing ring 32, said coupling seal 30 being mounted on the steering casing 5 by engaging the first sealing ring 31 on the steering column 23, so that said first sealing ring 31 surrounds and clasps said steering column 23 allowing said steering column 23 to pass across the coupling seal 30, and depressing the coupling seal 30 until said coupling seal 30 abuts against an endplate 33 of said steering casing 5, and then comprising placing the steering device 3 against the bulkhead 7, by bringing the steering casing 5 closer to said bulkhead 7 until the second sealing ring 32 bears against said bulkhead 7 and is sandwiched between the endplate 33 of the steering casing 5 and the bulkhead 7, at a distance and around the first sealing ring 31.

It will be noted that the aforementioned method may preferably be applied, as indicated above, to a steering casing 5 which is formed by a shell obtained by joining a lower shell portion, forming a base 26, and an upper shell portion made of polymer material, forming a bell-housing 27, which covers said base 26, the endplate 33 of the steering casing 5 advantageously forming the endplate of a chimney 34 which is formed integrally with said bell-housing 27 and which extends along and around the steering column 23.

The invention claimed is:

1. A vehicle comprising a passenger compartment intended to accommodate at least one driver, the vehicle being equipped with a steering device which comprises a steering mechanism protected by a steering casing, the steering casing being itself housed in a compartment of the vehicle, which is separated from the passenger compartment by at least one bulkhead partition wall, the steering device also comprising a steering wheel, located in the passenger compartment, the steering wheel to which the steering mechanism is connected by means of a steering column which emerges from the steering casing and which crosses the bulkhead partition wall, the vehicle includes, in order to ensure sealing around the steering column, between the steering casing and the bulkhead partition wall, a coupling seal made of elastomer material which comprises, integrally, a first central sealing ring which surrounds and clasps the steering column and through which the steering column passes across the coupling seal and a second peripheral sealing ring which is interposed between the steering casing and the bulkhead partition wall, at a distance and around the first sealing ring, wherein the first central sealing ring is connected to the second peripheral sealing ring by means of a layer formed integrally with said first central sealing ring and the second peripheral sealing ring and wherein the layer has, on a first face, which is oriented toward and bears against the steering casing, at least one elastic anchoring lug, distinct from the first central sealing ring, and wherein the at least one elastic anchoring lug cooperates with the steering casing by snap-fitting in order to retain the coupling seal against the steering casing.

2. The vehicle according to claim 1, wherein the first central sealing ring forms a wiper seal in contact with and inside which the steering column may be displaced at least in yaw rotation, about its longitudinal axis.

3. The vehicle according to claim 1 wherein the first central sealing ring forms a lip seal comprising one or more lips, whose one or more lips rub against an outer surface of the steering column.

4. The vehicle according to claim 3 wherein the first central sealing ring has two lips, which correspond each to a hemisphere portion of a same spherical zone.

5. The vehicle according to claim 1 wherein the layer connecting the first central sealing ring and the second peripheral sealing ring is of a thickness less than a thickness of the second peripheral sealing ring.

6. The vehicle according to claim 5 wherein the first central sealing ring protrudes from the layer on a first face of the layer oriented toward the steering casing, while the second peripheral sealing ring protrudes from the layer on a second face of the layer oriented towards the bulkhead partition wall, opposite the first central sealing ring.

7. The vehicle according to claim 1 wherein the first central sealing ring is oriented along a first central axis and the second peripheral sealing ring is oriented according to a second central axis which has a non-zero inclination relative to the first central axis.

8. The vehicle according to claim 1, wherein the second peripheral sealing ring is formed by a tubular bulb.

9. A vehicle comprising a passenger compartment intended to accommodate at least one driver,
the vehicle being equipped with a steering device which comprises a steering mechanism protected by a steering casing, the steering casing being itself housed in a compartment of the vehicle, which is separated from the passenger compartment by at least one bulkhead partition wall,
the steering device also comprising a steering wheel, located in the passenger compartment, the steering wheel to which the steering mechanism is connected by means of a steering column which emerges from the steering casing and which crosses the bulkhead partition wall,
the vehicle includes, in order to ensure sealing around the steering column, between the steering casing and the bulkhead partition wall, a coupling seal made of elastomer material which comprises, integrally, a first central sealing ring which surrounds and clasps the steering column and through which the steering column passes across the coupling seal and a second peripheral sealing ring which is interposed between the steering casing and the bulkhead partition wall, at a distance and around the first sealing ring,
wherein the steering casing being provided with a porous and hydrophobic breathing member, permeable to air but impermeable to water, arranged to allow a pressure balancing between an inside of the steering casing and an outside of the steering casing, the coupling seal comprises, between the first central sealing ring and the second peripheral sealing ring, a vent which passes across said coupling seal in a thickness direction with respect to the breathing member, in order to allow gaseous exchanges between the steering casing and the passenger compartment of the vehicle.

10. The vehicle according to claim 9, wherein the first central sealing ring forms a wiper seal in contact with and inside which the steering column may be displaced at least in yaw rotation, about its longitudinal axis.

11. The vehicle according to claim 9, wherein the first central sealing ring forms a lip seal comprising one or more lips, whose one or more lips rub against an outer surface of the steering column.

12. The vehicle according to claim 11, wherein the first central sealing ring has two lips, which correspond each to a hemisphere portion of a same spherical zone.

13. The vehicle according to claim 9 wherein the first central sealing ring is connected to the second peripheral sealing ring by a layer which is of a thickness less than a thickness of the second peripheral sealing ring.

14. The vehicle according to claim 13, wherein the first central sealing ring protrudes from the layer on a first face of the layer oriented toward the steering casing, while the second peripheral sealing ring protrudes from the layer on a second face of the layer oriented towards the bulkhead partition wall, opposite the first central sealing ring.

15. The vehicle according to claim 9, wherein the first central sealing ring is oriented along a first central axis and the second peripheral sealing ring is oriented according to a second central axis which has a non-zero inclination relative to the first central axis.

16. The vehicle according to claim 9, wherein the second peripheral sealing ring is formed by a tubular bulb.

17. A method for assembling a steering device, comprising a steering mechanism protected by a steering casing, in a compartment of a vehicle, which is separated from a passenger compartment of the vehicle by at least one bulkhead partition wall, the steering mechanism comprising a steering column which emerges from the steering casing and which passes across the bulkhead partition wall to be connected to a steering wheel,
the method comprising placing, in order to ensure sealing around the steering column, between the steering casing and the bulkhead partition wall, a coupling seal made of elastomer material which comprises integrally, a first central sealing ring which surrounds and clasps the steering column and through which the steering column passes across the coupling seal and a second peripheral sealing ring which is interposed between the steering casing and the bulkhead partition wall, at a distance and around the first sealing ring,
wherein the steering casing is provided with a porous and hydrophobic breathing member, permeable to air but impermeable to water, arranged to allow a pressure balancing between an inside of the steering casing and an outside of the steering casing, the coupling seal comprises, between the first sealing ring and the second sealing ring, a vent which passes across said coupling seal in a thickness direction with respect to the breathing member, in order to allow gaseous exchanges between the steering casing and the passenger compartment of the vehicle.

18. The method according to claim 17 the method comprising:
firstly mounting the coupling seal on the steering casing, in order to ensure the sealing around the steering column, between the steering casing and bulkhead partition wall, the coupling seal being mounted on the steering casing by engaging the first sealing ring on the steering column, so that the first sealing ring surrounds and clasps the steering column allowing the steering column to pass across the coupling seal, and depressing the coupling seal until the coupling seal abuts against an endplate of the steering casing, and then
placing the steering device against the bulkhead partition wall, by bringing the steering casing closer to the bulkhead partition wall until the second sealing ring bears against the bulkhead partition wall and is sandwiched between the endplate of the steering casing and the bulkhead partition wall, at a distance and around the first sealing ring.

19. The method according to claim 17 wherein the steering casing is formed by a shell obtained by joining a lower shell portion, forming a base, and an upper shell portion made of polymer material, forming a bell-housing that covers the base, and an endplate of the steering casing forms an endplate of a chimney that is formed integrally with the bell-housing and that extends along and around the steering column.

\* \* \* \* \*